US008411655B2

(12) United States Patent
Khare et al.

(10) Patent No.: US 8,411,655 B2
(45) Date of Patent: Apr. 2, 2013

(54) SYSTEM AND METHOD FOR IMPLEMENTING PERSONALIZED INTERACTION

(75) Inventors: Rajendra Kumar Khare, Bangalore (IN); Ravi Bhat, Bangalore (IN); Abhijit Das, Bangalore (IN); Balakuntla Maheshkumar Gurucharan, Bangalore (IN); Aparna Sharma, Bangalore (IN); Saurabh Singh, Bangalore (IN); Mohammad Mohammad, Bangalore (IN)

(73) Assignee: Indus Edge Innovations Private Limited, Bangalore, IN (US)

( * ) Notice: Subject to any disclaimer, the term of this patent is extended or adjusted under 35 U.S.C. 154(b) by 365 days.

(21) Appl. No.: 12/741,206

(22) PCT Filed: Nov. 4, 2008

(86) PCT No.: PCT/IN2008/000731
§ 371 (c)(1),
(2), (4) Date: May 4, 2010

(87) PCT Pub. No.: WO2009/057146
PCT Pub. Date: May 7, 2009

(65) Prior Publication Data
US 2011/0096759 A1    Apr. 28, 2011

(30) Foreign Application Priority Data
Nov. 4, 2007 (IN) .......................... 2508/CHE/2008

(51) Int. Cl.
*H04W 4/00* (2009.01)
*H04L 12/66* (2006.01)
*H04N 5/74* (2006.01)
(52) U.S. Cl. ........ 370/338; 370/328; 370/353; 348/383; 348/752

(58) Field of Classification Search .......... 370/310–353; 709/201–234; 340/870.02, 825.69; 715/205, 715/234; 348/12.54, 383–752, 840, E7.071
See application file for complete search history.

(56) References Cited

U.S. PATENT DOCUMENTS 5,844,181 A * 12/1998 Amo et al. .................... 187/396
5,948,061 A * 9/1999 Merriman et al. ............ 709/219
6,002,450 A * 12/1999 Darbee et al. ................ 348/734

FOREIGN PATENT DOCUMENTS

WO   WO9959283    * 11/1999
WO   WO 02/29665  *  4/2002
WO   WO0229665    *  4/2002

OTHER PUBLICATIONS

Jason Dachman, Ericsson Unveils IPTV Remote to Control All Home-Based Media Devices, Published in Feb. 18, 2010.

*Primary Examiner* — Afsar Qureshi
(74) *Attorney, Agent, or Firm* — Barry Choobin; Choobin & Choobin Consultancy

(57) ABSTRACT

A system and method for implementing an interactive session between a display equipment and a handheld electronic device is provided. The system has a display screen operable to display a data/information, a telecommunication network coupled with a local area network and a world wide web, a smart-IB box capable of sending and receiving a data/information, a system server capable of interpreting the received messages from the Smart-IB and a user's mobile phone. The method involves detecting a request by a mobile phone, initiating a user preferred schedule for pushing a data/information in response to the request, determining the installation of an interactive interface to access the various options available through the menus, receiving and processing the request, sorting the request for a scheduled data/information, relaying and displaying the scheduled data/information in accordance with a preferred schedule.

18 Claims, 5 Drawing Sheets

SYSTEM AND METHOD FOR IMPLEMENTING PERSONALIZED INTERACTION

CROSS REFERENCE TO RELATED APPLICATION

This application is related to Indian Provisional Patent Application No. 2508/CHE12007 dated Nov. 4, 2007. The entire contents of which are incorporated herein by this reference. The applicant hereby claims the benefit of this earlier pending provisional application

FIELD OF THE INVENTION

The present invention relates to a personalized and customized interaction system that can be used for various transactions in a quick flexible manner. More particularly, it pertains to a system and method for implementing an interactive session between a novel display equipment and a handheld electronic device, for example contemporary handheld communication devices.

BACKGROUND OF THE INVENTION

The prime medium for entertainment and advertising in today's scenario are the television and the internet. However, these mediums offer various disadvantages and have several limitations. The number of mobile phone users has experienced tremendous growth recently. This growth has also facilitated an expansion in the features available on a mobile phone. For example, the mobile phones are now equipped with an Internet browser feature, an e-mail feature and the like. It is inevitable that the advertisers will "push" advertisements to the mobile phone users. Any type of advertising messaging feature should balance an economic benefit for the advertisers with a shopping advantage for the mobile phone users. The use of mobile phones as a medium for advertising has till date been implemented in a very restricted manner, which till date has not extended up to its maximum potential. Also, the popularity that the mobile phone has gained as an interactive and communications device is yet to be exploited to achieve a more active and focused advertising and entertainment tool.

Also, the television today has got too fragmented with several hundreds of channels available and the broadcaster has no control over the viewership. From a viewer's point of view, an individual chooses a particular channel he wants to watch and keeps shifting from one to other very frequently.

Further, from an advertiser's angle, it is difficult to reach out to a target group without having to choose a number of selected channels. Hence, this current methodology costs a lot of money as the multiple channels are expensive with only a small percentage of the viewers being the right target viewers. This is called carpet bombing wherein a lot of 'ammunition' is wasted for a very small set of the target viewers.

Even if the channels are chosen as required and the viewers watch the selected program, they have a tendency to switch the channels during a commercial break. As a result, the end objective of the brand to have the right viewers watching the brand message is not achieved.

Also, the internet delivers a brand message to an individual viewer when he/she pulls the specific content on their machine. This does not help a brand to reach a group of viewers simultaneously unless each of them pulls the content.

Besides, the internet as a medium is quite cluttered and not as visually appealing and readable as the TV which is a more vivid medium.

Further, moving on to the utility of the mobile phone today in the advertising and retail industry, its limited only to the extent of opinion polls for the events that happen on TV or radio.

Hence, therefore, a system is needed for implementing a method that intelligently communicates data/information to users in a manner that is acceptable to both the users and advertisers. Thus, there is a need for a system for providing a customized and field-specific range of menus and services to the user with an instant interactivity.

Further the limitations and the disadvantages of conventional and traditional approaches will become apparent to one skilled in the art, through a comparison of such systems with some aspects and the inventive features believed to be the characteristics of the invention are set forth in the appended claims. The invention itself, however, as well as preferred modes of use, further objects and advantages thereof, will be best understood by a reference to the following detailed description of illustrative embodiments when read in conjunction with the accompanying drawings.

SUMMARY OF THE INVENTION

A system and method for implementing an interactive session between a novel display equipment and a handheld electronic device such as handheld communication device is provided.

Briefly, one exemplary embodiment relates to a system for implementing an interactive session between a display equipment and a handheld communication device, the system comprises a display screen operable to display a data/information, a telecommunication network coupled with local area network and world wide web, a smart-IB box capable of sending and receiving the data/information, a system server capable of interpreting received messages from the Smart IB box and user's handheld communication device, and a handheld communication device.

Another exemplary embodiment relates to a method for implementing an interactive session between a display equipment and a handheld communication device. The method comprising the steps of detecting a request by a handheld communication device, initiating a user preferred schedule for pushing a data/information in response to the request, determining the installation of an enabling means to access the various options available through an enhanced enabling means, receiving and processing the request so made, sorting the request for a scheduled data/information, relaying and displaying the scheduled data/information in accordance with a preferred schedule.

It is an objective of the instant invention to implement an interactive session between a novel display equipment and a handheld electronic device, for example, the contemporary mobile phones.

It is another objective of the instant invention to enable a handheld communication device to be used as a device for various concepts such as local polls, promotions and commercials.

It is another objective of the instant invention to allow a short range wireless media such as Bluetooth interaction with the novel display device thereby levying no service charges and bypassing the service operator.

It is yet another objective of the instant invention to provide a user specific, configured, customized and location based data/information based on the preferences of the user.

BRIEF DESCRIPTION OF ACCOMPANYING DRAWINGS

The non-limiting and non-exhaustive features of the present invention together with its objects and advantages are described with reference to the accompanying drawings, like reference numerals refer to like elements throughout the various figures unless otherwise specified and wherein.

DETAILED DESCRIPTION OF THE INVENTION

A system and method for implementing an interactive session between a display equipment and a handheld electronic device such as handheld communication device is provided.

The handheld communication device being a handy and convenient tool is potentially one of the best and most suitable interactive mediums. As a step ahead of the existing applications, the present invention now extends the handheld communication device beyond its intended use. The handheld communication device now can be used as a device for various concepts such as local polls, promotions and commercials.

Also, it can be used for providing the coupons and promotional items instantly. While a user may use a handheld communication device for voting through SMS, the same can also be achieved through a Bluetooth interaction with the novel display device thereby levying no service charges and bypassing the service operator.

Further, the content provided on the handheld communication device or on the novel interactive screen can be customized and made location based or region-specific. It may further also be personalized to suit the user for which the display screen is being configured. It may also display a content specific to the personal settings of the user. This is achieved by first identifying the individual when he interacts with the display screen using his unique Bluetooth ID.

In the following description, for purposes of explanation, specific details are set forth in order to provide a thorough understanding of the present invention. It will be evident, however, to one skilled in the art that the present invention may be practiced without these specific details. In other instances, well known methods, procedures, components and circuits have not been described in detail so as not to obscure the present invention.

The present invention now will be described more fully hereinafter with reference to the accompanying drawings, which form a part hereof, and which show, by way of illustration, specific exemplary preferred embodiments by which the invention may be practiced. This invention may, however, be embodied in many different forms and should not be construed as limited to the embodiments set forth herein; rather, these embodiments are provided so that this disclosure will be thorough and complete and will fully convey the scope of the invention to those skilled in the art. The following detailed description is, therefore, not to be taken in a limiting sense.

Figure 1:
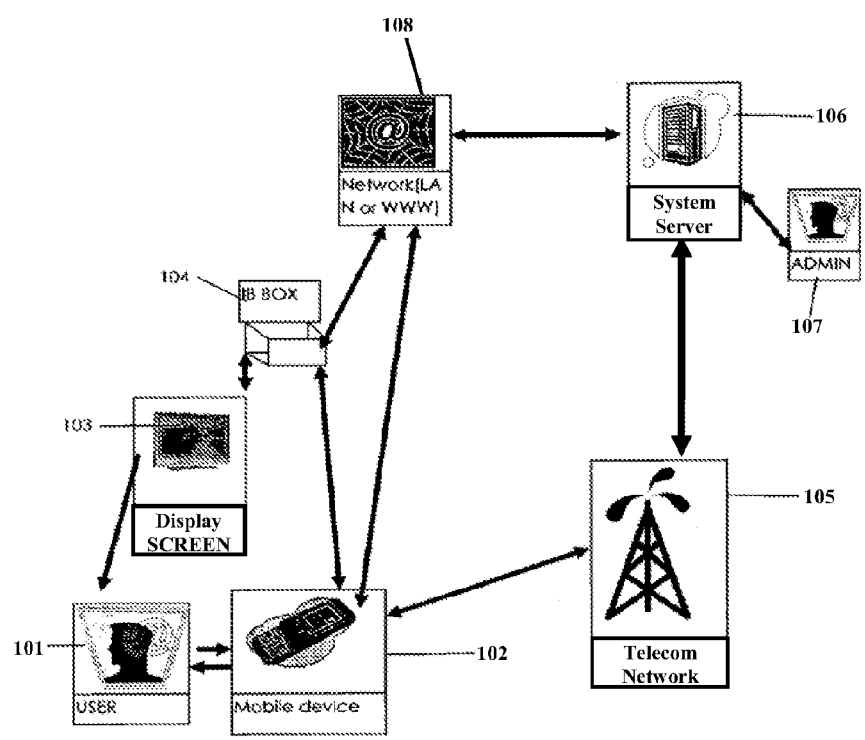
FIG. 1 illustrates a schematic diagram of a preferred embodiment of the hardware employed in a telecommunication system of the present invention.

As illustrated in FIG. 1, the system for implementing an interactive session between a display element (103) and a handheld communication device (102) is provided. The system comprises a display screen (103) operable to display a data/information, a telecommunication network (105) coupled with a local area network and world wide web (108), a smart IB box (104) capable of sending and receiving data/information, a system server (106) capable of interpreting received messages from Smart IB (104) and user's handheld communication device (102), a handheld communication device (102).

The user (101) may view the data/information on the display screen (103). If the user is interested and wants more information or if the information is of such a type that the user is asked to participate on and can be further engaged, using the system, the user can use a handheld communication device (102) such as a mobile phone and the like, whereby the user (101) interacts and engage with the display screen (103) and eventually with the system server (106). The user (101) may also connect to the smart-IB box (104) of the system and if needed, the user's engagement request is forwarded to the system server (106) or handheld communication device (102) at the smart-IB (104) end itself.

Figure 4:
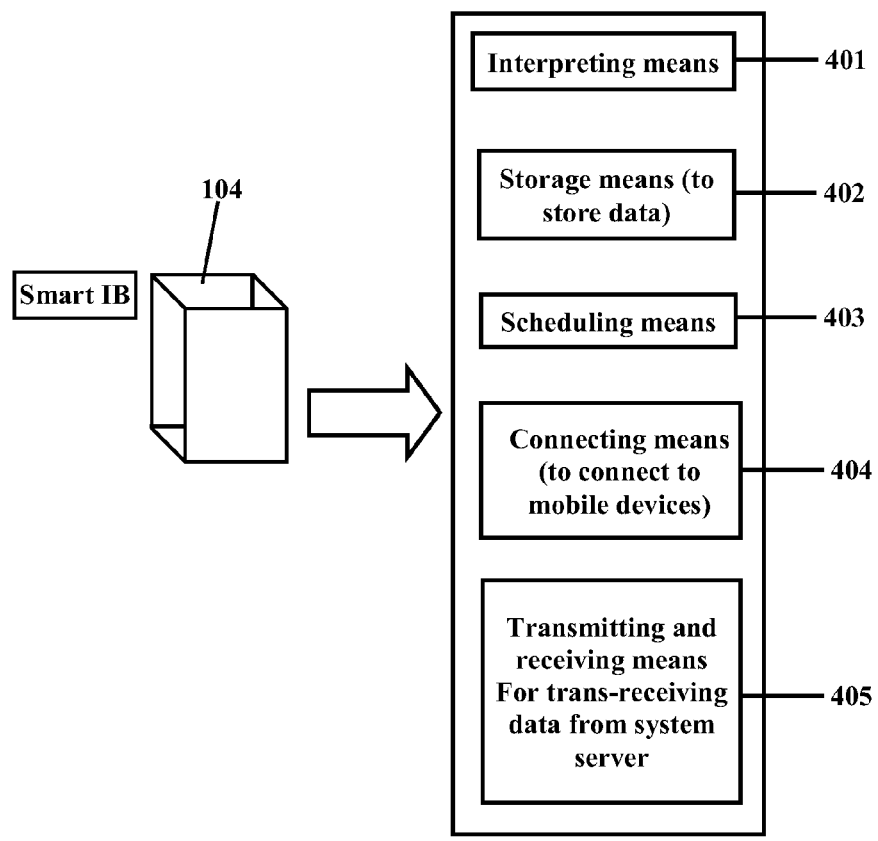
FIG. 4 illustrates the hardware elements of the smart-IB employed in a preferred embodiment of the present invention.

As illustrated in FIG. 4 according to a preferred embodiment of the instant invention, smart-IB (104) is a device capable of sending and receiving a data, capable of scheduling and streaming a data to be displayed on the display screen, capable of interpreting the received requests from a handheld communication device and also capable of processing such requests. In one of the preferred embodiments of the instant invention, the smart-IB (104) is capable of enabling the vicinity to support a short range wireless communication such as Bluetooth. In one of the preferred embodiments of the instant invention, the smart-IB (104) is capable of enabling the vicinity to support a wireless communication such as WIFI. The smart-IB includes interpreting means (401) to interpret requests, storage means (402) to store a data/information, scheduling means (403) to schedule a data/information, connecting means (404) to connect to a handheld communication device, transmitting and receiving means (405) for trans-receiving a data/information from system server.

To connect with smart-IB (104) box, the handheld communication (102) device may use short range wireless communication such as Bluetooth, wireless communication such as WLAN or WIFI. To communicate to the system's server (106), the user (101) may be given a plurality of options whereby the user (101) may communicate through short range wireless communication and/or WIFI of a telecommunication network.

Once a communication of the request is received by the system server (106), the server (106) may respond to user request by relaying a digital data (audio, video, text or combination thereof) to the display screen (103) or the handheld communication device (102). Since the multiple channels and their combination of communication is possible, the system intelligently uses the best possible options.

Furthermore, the system allows a communication channel wherein the user (101) responds to. the server (106) using wireless LAN (WIFI), enabled in the vicinity, and the server (106) responds by transmitting a user request (say for example a song) to the smart IB (104) which schedules and displays it on the screen (103). Similarly a user (101) may desire to display a photograph or text on the screen, the system enables those features also to be processed and displayed on the display screen (103). In case of display of a user generated data in one of the preferred embodiments of the instant invention, the system has a manual as well as an automated moderation feature. This is to prevent any obsolete or unwanted data/information to be displayed on the screen which is at the disposal of everyone.

Figure 2:
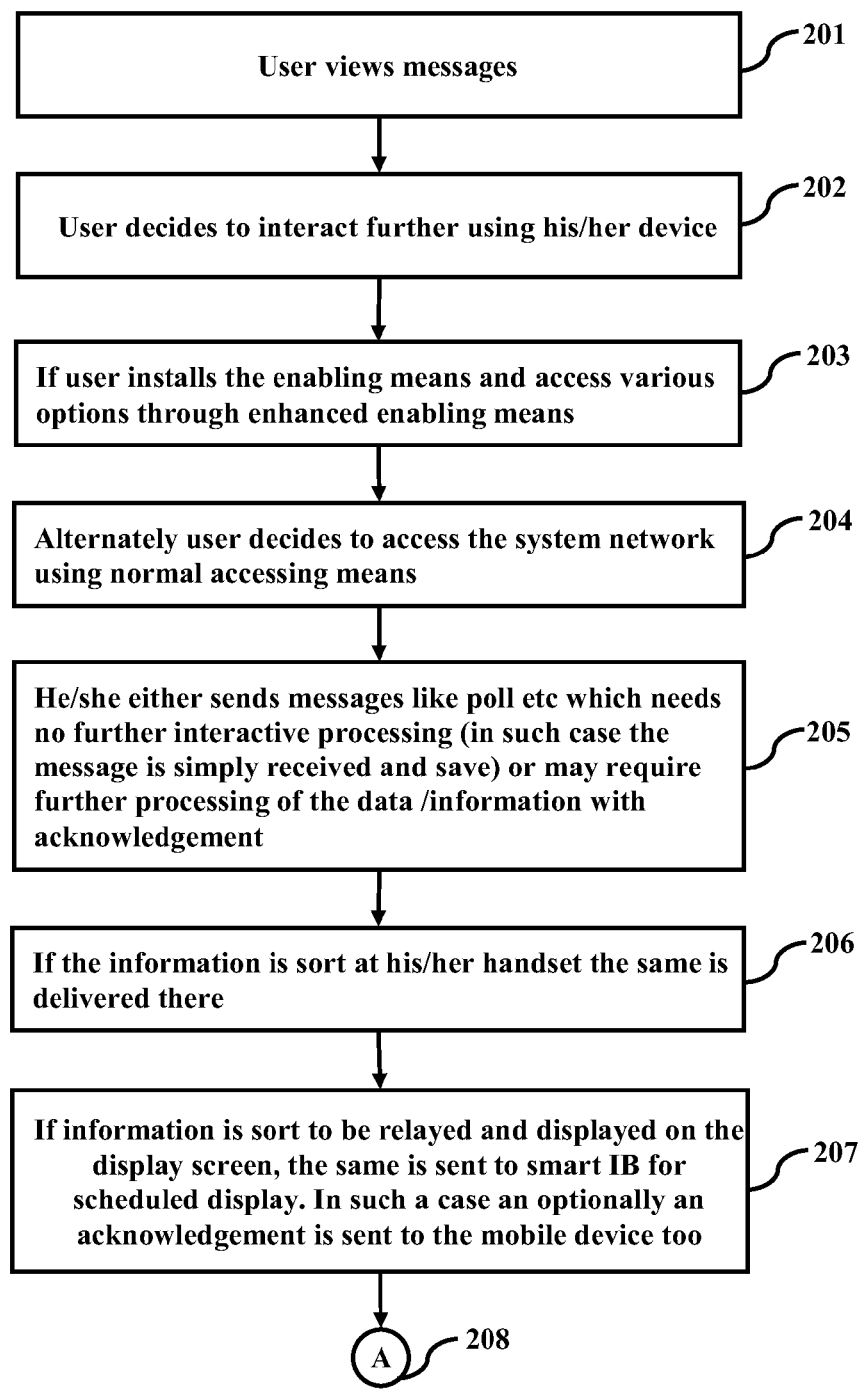
FIGS. 2 and 3 illustrates the method for implementing an interactive session between a display equipment and a handheld electronic communication device according to a preferred embodiment of the present invention.

Referring now to FIG. 2, a method for implementing an interactive session between a display equipment and a handheld communication device is provided. The method comprises the steps of detecting a request by a handheld communication device, initiating a user preferred schedule for pushing a data/information in response to the request, determining the installation of an enabling means to access the various options available through an enhanced enabling means, receiving and processing the request so made, sorting the request for a scheduled data/information, relaying and displaying the scheduled data/information in accordance with a preferred schedule.

In the instant method the user comes into contact with a display screen (201) and decides to interact further with the display media using the handheld communication device (202). User may be enabled to access various options through enhanced enabling means if such enabling means already installed in the user's handheld communication device (203), otherwise also the user is allowed to interact with the system network (204). The user may send the messages to the system network like messages relating to opinion polls or the like which requires no further interactive processing. In such a case, the message is simply received and saved by the system network (205) or the user may request for further processing of the data/information with acknowledgement. If the data/information is sorted at the user's handheld communication device, such data/information is delivered to the handheld communication device (206). If the information so sorted is to be relayed and displayed on the display screen, such sorted data/information is forwarded to smart-IB for a scheduled display. In such a case, the handheld communication device is acknowledged of the data/information so received (207).

Figure 3:
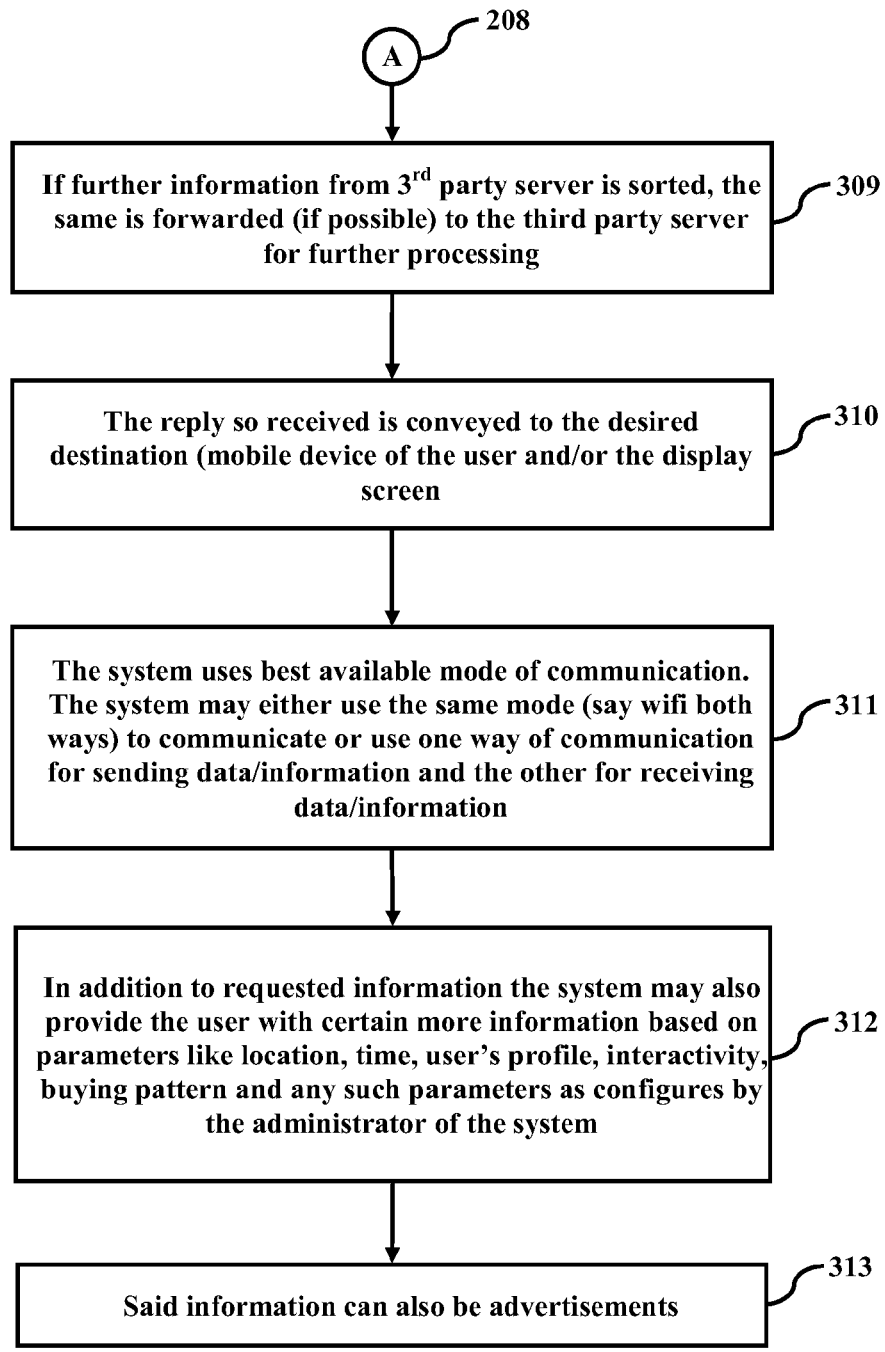

Referring to FIG. 3 if the user requests for information which is available with a third party server, such a request is forwarded to such a third party server for further processing (309). The response to the such request received is forwarded to the desired destination which may be the user's handheld communication device and/or the display screen (310). The communication link is established between the communication device and system server based on the best mode available to the system (311). The server may either use a single mode i.e. WIFI for both ways of communication to send and receive the data/information. Otherwise, the server may use one mode of communication for sending the data/information and the other mode for receiving the data/information. In a preferred embodiment, in addition to a requested information, the interactive system may also provide the user with certain information (312) based on parameters, like location based information, time based information, user's profile based information, buying pattern based information and the like as configured and/or scheduled by the administrator of the system. Such data/information (313) comprises an advertisement content.

Figure 5:
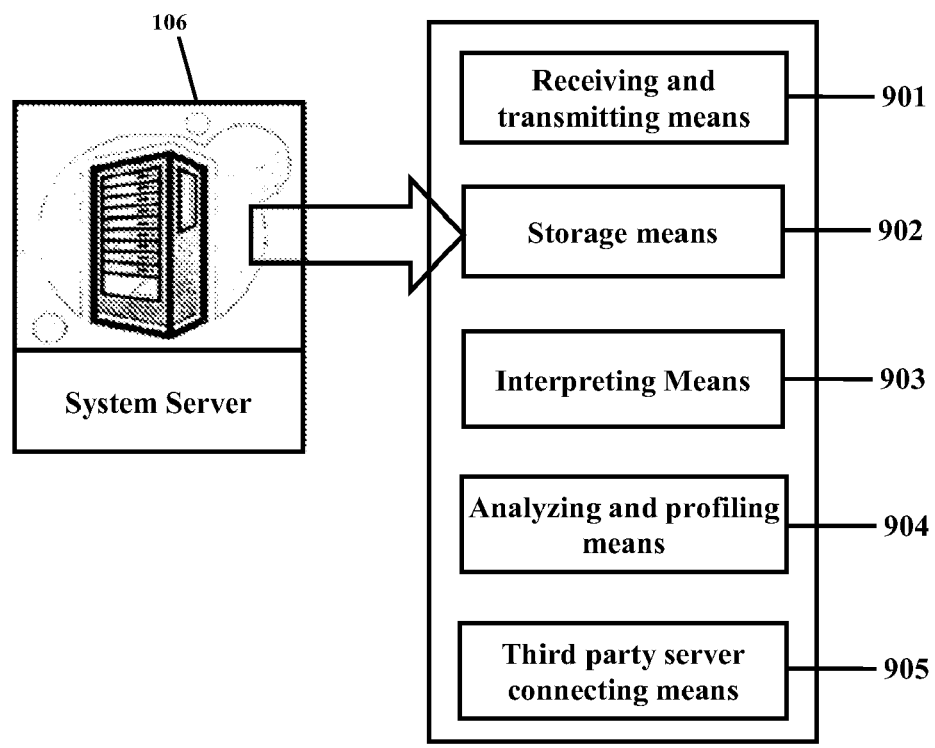
FIG. 5 illustrates the hardware elements of the System Server employed in a preferred embodiment of the present invention.

Reference now will be made to FIG. 5, wherein the hardware elements of the System Server (106) employed in a preferred embodiment of the present invention are illustrated. The system server (106) includes a receiving and transmitting means for trans-receiving a data/information (901), a storage means to store the data/information (902), an interpreting means to interpret the requests (903), an analyzing and profiling means (904) and a third party server connecting means (905). The system server (106) is capable of interpreting the received messages from a smart-IB and a user's communication device. It further consists of a storage means to store an audio-video content etc., and interactive log details, a communicating means to communicate with the smart-IB and a telecommunication network and other networks to share a data/information like log details, to fetch data, enable payments etc. The server (106) is also comprised of a receiving and transmitting means to send, receive and transmit a data/information to the handheld communication device and/or the display screen.

Such interactivity solves the following purposes:
a} They act as an engagement tool;
b} They help gauge the extent of impact for a particular campaign made;
c} Based on the extent of impact, one may wish to modify the data/information so presented, change a user interface etc.

Since digital output of home screens are not usually capable of interaction (with exceptions to small touch screen panels that provide limited interactivity, besides they cater to a specific audience that too one person at a time), the interactivity is enabled by either enabling the vicinity so that the user can use his handheld communication device. This can be done by either supporting a short range wireless communication such as Bluetooth, a wireless communication such as WIFI, or supporting interactivity with the screen through the telecommunication network, like GSM, CDMA, 3G handheld communication devices. The instant invention proposed a system and a method which supports all of these.

In yet another example, the user using the handheld communication device interacts with the system server through SMS for example, sends a request for a song. The user may get the song over the communication device streamed through WIFI network of the area or if the user so desires, the same may be transmitted to the Smart IB and scheduled for further viewing.

In one of the preferred embodiments of the instant invention, to enable such interactivity, the system transmits an enabling means on to the handheld communication device of the user which subject to the permission of the user reside on the communication device.

These enabling means are useful having features which further promote interactivity.

Thus, a convenient and mobile solution is provided. Since a handheld communication device is compact and always in possession of a user, its use as an interactive tool is widespread and convenient. Also, the services provided or the menus displayed can be configured and personalized according to the user's personal requirements or depending on the phone he is using. They also may be location based or region specific.

Although, the invention has been described with reference to specific examples, it would be appreciated by those skilled in the art that the invention may be embodied in many forms without departing from the broader spirit and scope of the invention as set forth in the invention. Preferred embodiments of this invention have been described herein, including the best mode known to the inventor for carrying out the invention. Variations of those preferred embodiments may become apparent to those of ordinary skill in the art upon reading the foregoing description.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Accordingly, the specification and drawings are to be regarded in an illustrative rather than a restrictive sense without departing from the spirit and scope of the invention, the invention resides in the claims hereinafter appended.

What is claimed is:

1. A system for implementing an interactive session between a display equipment and a handheld communication device, the system comprising:
   a display screen operable to display a data/information;
   a telecommunication network coupled with a local area network and a world wide web;
   a smart-IB box capable of sending and receiving a data/information;
   a system server capable of interpreting a received message from the smart-IB and a user's handheld communication device;
   a handheld communication device,
   an enabling means transmitted and installed in the handheld communication device to provide an interaction between the display screen and the handheld communication device, and wherein the enabling means is installed in the handheld communication device to access various options available through an enhanced enabling means, and wherein the enabling means is a user interface and wherein the enabling means is an interactive session, and wherein the enhanced enabling means is a menu in the handheld communication device.

2. The system as claimed in claim 1, wherein said Smart-IB capable of:
   sending and receiving the data/information;
   scheduling and streaming a data/information to be displayed;
   interpreting and processing the requests received from the handheld communication device;
   enabling a vicinity to support a short range wireless communication, and wherein the short range wireless communication is Bluetooth;
   enabling the vicinity to support a wireless communication, and wherein the wireless communication is WIFI.

3. The system as claimed in claim 1, wherein said Smart-IB further comprising:
   interpreting means to interpret requests;
   storage means to store a data/information;
   scheduling means to schedule a data/information;
   connecting means to connect to a handheld communication device;
   transmitting and receiving means for transmitting and receiving a data/information from the system server.

4. The system as claimed in claim 1, wherein said system server further comprising includes:
   receiving and transmitting means for transmitting and receiving a data/information;
   storage means to store the data/information;
   interpreting means to interpret requests;
   analyzing and profiling means;
   third party server connecting means.

5. The system as claimed in claim 1, wherein the handheld communication device is used as an interactive medium for local polls, promotions and commercials.

6. The system as claimed in claim 1, wherein the handheld communication device is used as an interactive medium with the display screen through a Bluetooth interaction to display a content which is specific to a personal settings of a user using a unique Bluetooth ID of user, thereby levying no service charges and bypassing the service operator.

7. The system as claimed in claim 1, wherein the handheld communication device is used as an interactive medium with the display screen through a Bluetooth interaction to provide the user with a certain information and wherein the certain information is selected from a group consisting of a location based information, a time based information, a user's profile based information, a buying pattern based information and wherein the certain information is configured and scheduled by an administrator of a system.

8. The system as claimed in claim 1, wherein the system has a manual or an automated moderation feature in case of display of a user generated data to prevent a display of any obsolete or unwanted data or information.

9. A method for implementing an interactive session between a display equipment and a handheld communication device, the method comprising the steps of:
   detecting a request by a handheld communication device;
   initiating a user preferred schedule for pushing a data/information in response to the request;
   determining an installation of an enabling means to access various options available through an enhanced enabling means, and wherein the enabling means is a user interface and wherein the enabling means is an interactive session, and wherein the enhanced enabling means is a menu;
   receiving and processing the request made by the handheld communication device;
   sorting the request for a scheduled data/information;
   relaying and displaying the scheduled data/information in accordance with the user preferred schedule.

10. The method as claimed in claim 9, wherein the enabling means is transmitted to the handheld communication device in accordance with the preferences of the user and wherein the enabling means is the interactive session.

11. The method as claimed in claim 9, wherein the request for the scheduled data/information is processed through a Smart-IB.

12. The method as claimed in claim 9, wherein the data/information is capable of being retrieved from a system server.

13. The method as claimed in claim 9, wherein the data/information retrieved from a third party server on request.

14. The method as claimed in claim 9, wherein the system server uses one or more modes to communicate with the handheld communication device and with a display equipment, and wherein the system server uses a single mode for a both way communication to send and receive the data/information, and wherein the system server use one mode of communication for sending the data/information and an another mode for receiving the data/information.

15. The method as claimed in claim 9, wherein the display of data/information comprises the display of data/information configured by a system administrator.

16. The method as claimed in claim 9, further comprising:
establishing a communication link between the handheld communication device and a system network in response to a reception of a contact command indicating a desire of a user for an establishment of a communication link.

17. The method as claimed in claim 16, wherein the communication link is established using a short range wireless communication and/or a wireless communication, and wherein a short range wireless communication is Bluetooth and wherein the wireless communication is WLAN and/or WIFI.

18. The method as claimed in claim 9, further comprising a step of interaction with a system network wherein the user interacts with the system server through a short messaging service (SMS).

* * * * *